Feb. 13, 1940.    S. GOLUB ET AL    2,190,473
PHYSICIAN'S HEAD MIRROR
Filed Nov. 27, 1937
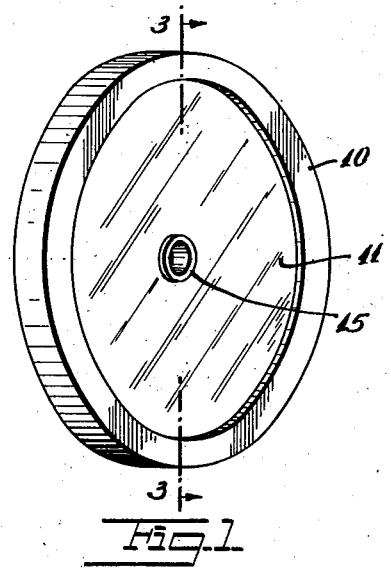
Fig. 1
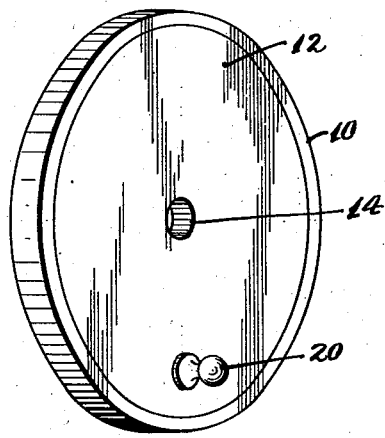
Fig. 2
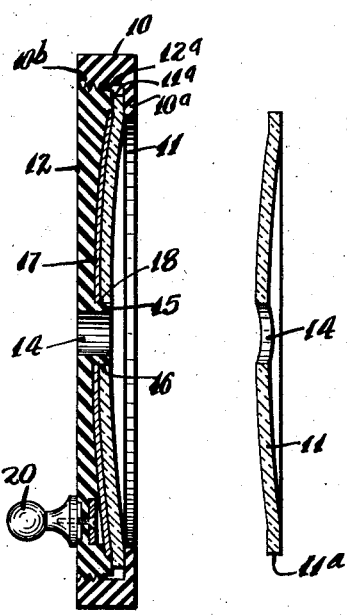
Fig. 3.   Fig. 6.
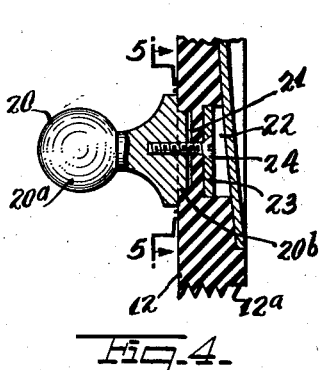
Fig. 4.
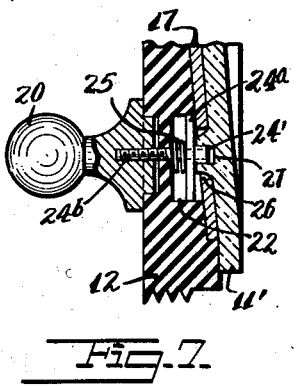
Fig. 7.
Fig. 5.
INVENTORS
Samuel Golub
Bernard Frommer
BY
ATTORNEY Patented Feb. 13, 1940

2,190,473

UNITED STATES PATENT OFFICE 2,190,473

PHYSICIAN'S HEAD MIRROR

Samuel Golub and Bernard Frommer, New York, N. Y.

Application November 27, 1937, Serial No. 176,783

3 Claims. (Cl. 128—21)

This invention relates to new and useful improvements in a physician's head mirror.

The invention has for an object the construction of a device as mentioned which is characterized by an annular casing of some phenol condensation product, as Bakelite, which has a flange portion on its front face and a threaded internal portion adjacent its rear face and adapted to support a concave mirror in conjunction with a back cover disc.

It is proposed to provide the concave mirror with a flange portion adapted to rest against the flange portion of the annular casing and to arrange the back cover disc to threadedly engage the threaded internal portion of the annular casing, and to have a projecting annular bead engageable against the rear face of the flange portion of the mirror for holding the mirror fixedly.

Still further the invention proposes the provision of a gasket disc interposed between the back cover and the back of the mirror for protecting the silvering of the mirror.

Another object of the invention is to arrange a knob on the back cover disc by which the cover disc may be gripped to screw it in and remove it from the annular casing, and it is contemplated to form the knob with a spherical head adapted to be utilized as one of the elements of the spherical joint for universally supporting the mirror.

Still further the invention proposes a modification characterized by arranging the knob longitudinally movable and to be connected with a stem adapted to fixedly engage an opening in the back of the mirror as hereinafter more fully described.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a perspective view of a physician's head mirror viewed from the front and constructed according to this invention.

Fig. 2 is a perspective view of the device shown in Fig. 1 viewed from the rear.

Fig. 3 is a vertical sectional view taken on the line 3—3 of Fig. 1.

Fig. 4 is a fragmentary enlarged detailed view of a portion of Fig. 3.

Fig. 5 is a sectional view taken on the line 5—5 of Fig. 4.

Fig. 6 is a sectional perspective view of the mirror, per se.

Fig. 7 is a sectional view similar to Fig. 4 but illustrating a modification of the invention.

The physician's head mirror, according to this invention, includes an annular casing 10 having a flange portion 10ª on its front face and a threaded internal portion 10ᵇ adjacent its rear face. A concaved mirror 11 is mounted within the casing 10 and has a flange portion 11ª resting against the flange portion 10ª. A back cover disc 12 threadedly engages the threaded portion 10ᵇ and is formed with a projecting annular bead 12ª engaging the rear face of the flange 11ª of the mirror for holding the mirror fixedly in place.

The annular casing 10 and the back cover disc 12 preferably should be made from some phenol condensation product such as Bakelite. This material has sufficient rigidity to properly hold the mirror in position, and at the same time is sufficiently soft so as not to crack or damage the mirror by gripping it too tightly at its flange portion 11ª.

The periphery of the disc 12 is formed with threads which threadedly engage the threaded portion 10ᵇ of the annular casing. The annular bead 12ª is of a slightly smaller diameter than the threaded area of the cover disc. At its front the cover disc 12 is formed with an opening 14, the inner end portion of which is surrounded by a projecting tubular portion 15. The mirror 11 is formed with a central opening 16 into which the tubular portion 15 projects. This projecting portion 15 serves to properly center the mirror within the annular casing. The opening 14 permits a physician to look through at a person under proper lighting conditions, not illustrated nor described in this specification since the arrangement is well known to those skilled in the art.

A gasket disc 17 is interposed between the inner face of the mirror 11 and the adjacent face of the disc 12. This gasket 17 is for the purpose of protecting the silvered inner face of the mirror against damage when the back cover disc 12 is screwed into position. The disc 17 is formed with a central opening 18 through which the projecting portion 15 extends. The gasket disc 17 is of a slightly smaller diameter than the diameter of the annular bead 12ª and is to rest against the face of the cover disc 12.

On the outer face and near its perimeter, the back cover disc 12 is provided with a knob 20 by which the cover disc may be readily gripped and turned to screw it into or to remove it from the annular casing 10.

The knob 20 has a spherical outer end 20a adapted to form one element of a universal joint, not shown on the drawing, generally used to support physician's head mirrors. The inner end of the knob 20 is provided with a square shank portion 20b engageable within a receiving square opening 21 formed in the outer face of the cover disc 12. Aligned with this square opening, but formed inwards from the inner face of the cover disc 12, there is a square recess 22 in which a washer 23 is positioned. A screw 24 engages through this washer, and through the wall of the cover disc 12 at the base of the recess 22 and threadedly engages into the knob 20. This screw 24 serves to fixedly hold the knob in position.

In Fig. 7 a modification of the invention has been disclosed which distinguishes from the prior form essentially in the mounting and supporting of the knob 20. According to this form of the invention there is a stem 24' which is formed intermediate of its ends with a flange 24a. This flange 24a is slidably engaged in the recess 22. The stem 24' has a threaded end 24b which threadedly engages into the knob 20 to hold the knob in position. A small expansion spring 25 is disposed within the recess 22 and acts between the base of the recess and the flange 24a for normally urging the stem 24' inwards. In the latter position of the stem its end passes through an opening 26 formed in the gasket disc 17 and engages into another opening 27 formed in the rear face of the mirror 11'.

The knob 20 may be slightly drawn outwards as permitted by the compression of the spring 25 to disengage the stem 24' from the opening 27 when desired. This is of utility in removing the cover disc 12 from the casing 10 after these parts have been assembled for sometime and they are sticking to each other.

The use of the stem 24 may be better understood from the following: To assemble the head mirror the mirror 11' is placed against the cover disc 12 in a position in which the stem 24' engages in the opening 27. The parts are thus "keyed" together. It is now possible to rotate the cover disc 12 by using the knob 20 as a handle and screw it into the casing 10. The mirror 11' will rotate along with the cover disc 12 so that there is no possibility of relative turning between the mirror 11' and the gasket disc 17. Thus there is no possibility of the silvering on the rear of the mirror becoming scratched. The cover disc 12 may be removed by turning it and gripping the knob 20. But should the parts be stuck together and when an attempt is made to turn the cover disc 12, it becomes apparent that too much stress is necessary to accomplish actual turning, then the knob 20 may be pulled outwards slightly to disconnect the stem 24 from the mirror 11'. Now it will require less force to turn the cover 12 since the additional load of turning the mirror 11' has been removed.

While we have illustrated and described the preferred embodiments of our invention, it is to be understood that we do not limit ourselves to the precise constructions herein disclosed and the right is reserved to all changes and modifications coming within the scope of the invention as defined in the appended claims.

Having thus described our invention, what we claim as new, and desire to secure by United States Letters Patent is:

1. A physician's head mirror comprising an annular casing having a flange portion on its front face and a threaded internal portion adjacent its rear face, a concaved mirror within said casing having a flange portion resting against said flange portion, a back cover disc threadedly engaging said threaded internal portion having a projecting annular bead engaging the rear face of the flange of said mirror for holding the mirror fixedly, and a gasket disc interposed between the back of the mirror and the adjacent face of said cover disc, said cover disc being formed with a central opening aligned with an opening at the center of said mirror, and a projecting flange being arranged on the cover disc and extending into the opening of said mirror.

2. A physician's head mirror comprising an annular casing having a flange portion on its front face and a threaded internal portion adjacent its rear face, a concaved mirror within said casing having a flange portion resting against said flange portion, a back cover disc threadedly engaging said threaded internal portion having a projecting annular bead engaging the rear face of the flange of said mirror for holding the mirror fixedly, and a knob mounted on the back face of said cover disc near the periphery thereof, said knob having a spherical outer end, and at its inner end being provided with a square shank engageable into a square opening in said cover disc, and a screw for holding said knob on said cover disc.

3. A physician's head mirror comprising an annular casing having a flange portion on its front face and a threaded internal portion adjacent its rear face, a concaved mirror within said casing having a flange portion resting against said flange portion, a back cover disc threadedly engaging said threaded internal portion having a projecting annular bead engaging the rear face of the flange of said mirror for holding the mirror fixedly, a stem axially slidably mounted through said back cover, a knob on the back of said cover disc held in position by said stem, resilient means urging said knob and stem inwards, and the inner end of said stem engaging within an opening in the back of said mirror.

SAMUEL GOLUB.
BERNARD FROMMER.